May 17, 1960     R. A. ROBERT ET AL     2,936,676
SYSTEM FOR RELEASING OBJECTS SUSPENDED FROM AIRCRAFT
Filed Oct. 4, 1954
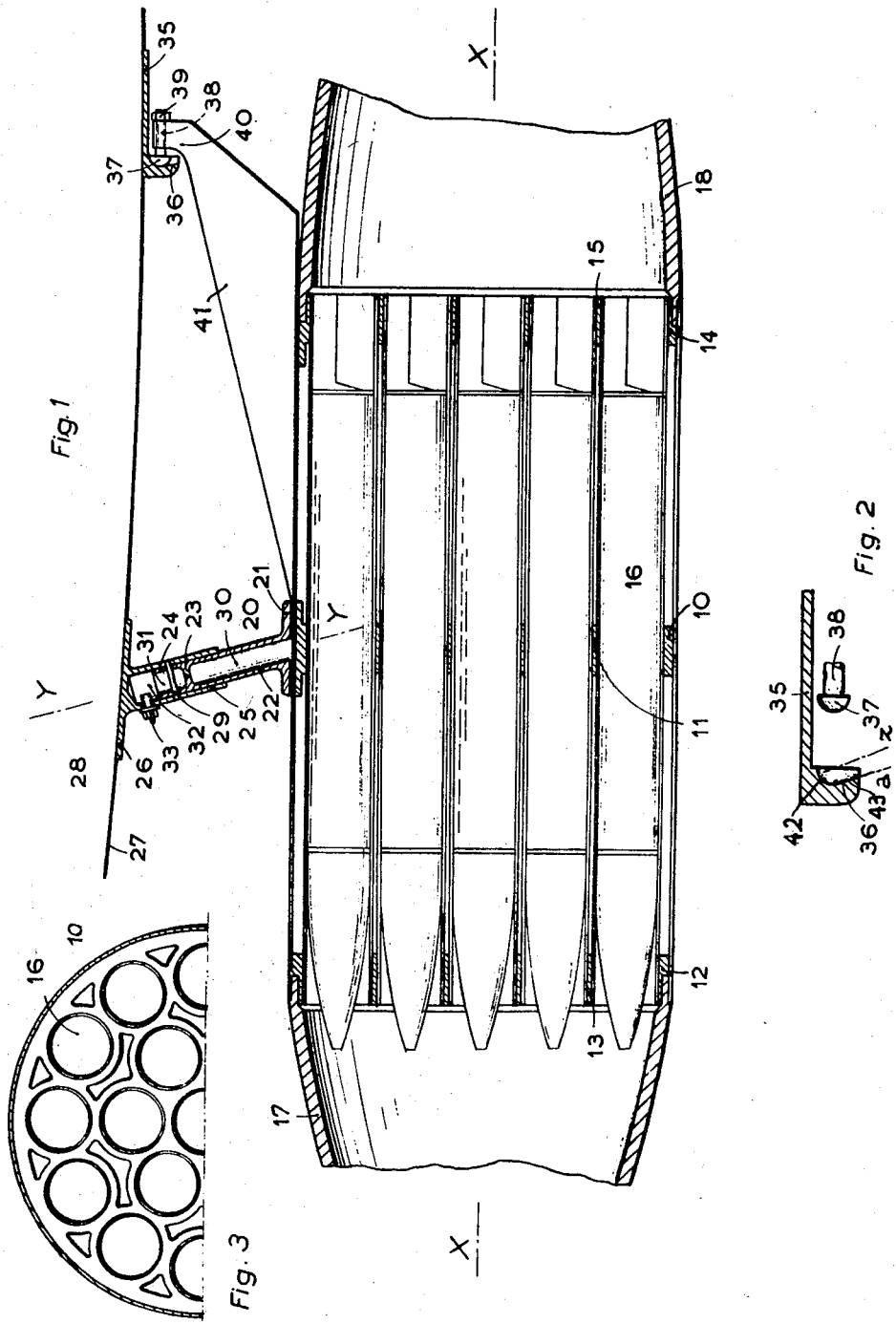

United States Patent Office 2,936,676
Patented May 17, 1960

2,936,676

SYSTEM FOR RELEASING OBJECTS SUSPENDED FROM AIRCRAFT

Roger Aimé Robert, Boulogne-sur-Seine, and Pierre P. Matge, Drancy, France

Application October 4, 1954, Serial No. 460,201

Claims priority, application France November 27, 1953

1 Claim. (Cl. 89—1.5)

This invention relates to a system for releasing objects suspended from an aircraft, particularly for releasing a rocket-bomb support, after the load of rockets thereof has been fired.

It is an object of the invention to provide a system whereby objects suspended from aircraft may be released or dropped under conditions such that the object will not be liable to hit any part of the aircraft, even in cases where the craft is flying at very high speeds and in cases where the object is comparatively lightweight.

It is a specific object of the invention to provide a system for releasing or dropping a rocket-bomb support or magazine after the rockets contained in said magazine have been released or fired.

It is also an object to provide such a system for dropping an object, especially a rocket-bomb support, suspended from under a wing of an aircraft flying at high speed, and for doing this with complete safety despite the aerodynamical effects to which the said object is subjected.

According to the invention the object to be released or dropped is subjected to a force which has the effect temporarily to aid the effect of gravity. In this way the object is moved away at a more rapid rate from the part of the aircraft from which it was supported.

The invention contemplates a preferred embodiment wherein the force instead of being directed vertically is directed substantially along the resultant of the weight of the object to be dropped with the aerodynamical force exerted on the object.

The force of the explosion is thus developed under the most satisfactory conditions conceivable and the danger of jamming is eliminated.

Experience has shown that a rocket-bomb support released by means of such a system runs no danger of hitting any part of the craft, particularly the tail elements thereof.

A clear understanding of the invention will be had from the ensuing description relating to a form of embodiment selected by way of example. In this description reference is made to the accompanying drawings wherein:

Fig. 1 is a vertical sectional view;

Fig. 2 is a view of part of the system on an enlarged scale;

Fig. 3 is a transverse cross section of one half of the system.

The supporting unit for the rocket-bombs or rockets is generally in the form of a cylindrical barrel. It comprises a median wall or partition 10 formed with a number of circular cells or sockets 11, a front wall 12 formed with cells 13 similarly disposed to the cells 11 and a rear wall 14 also formed with similarly disposed cells 15. Lodged in these cells are rockets 16, the whole assembly thereof being symmetrical about the axis X—X. A front fair-shaped cowling 17 is secured to the wall 12 and a trailing end cowling 18 is secured to the rear wall 14. The cowlings 17 and 18 are made of a suitable material which is undeformable under the aerodynamic forces exerted thereon but which at the same time is adapted to break up into a multiplicity of small fragments at the time the first rocket is fired. The support is rigidly connected with a tubular arm 20 secured to the upper part of said support by means of a flange 21, said arm extending from the support in a direction substantially coinciding with the resultant of the force of gravity applied to the support (when the latter is in condition for release) with the aerodynamical forces exerted on the support. The axis of the tubular arm extends substantially through the centre of gravity of the rocket support or through a point slightly rearward of said centre. The arm 20 comprises a main or body part 22 formed with a partition 23 beyond which the tubular arm presents an extension part 24. The body part 22 is slidably fitted in a tubular appendage 25 formed with a flange 26 secured to the under face 27 of an aircraft wing 28. Extending both through the appendage 25 and extension part 24 is a shear pin 29. The wall 23 defines a lower chamber 30 and an upper chamber 31. Placed in the upper chamber is an explosive charge 32 adapted to be fired electrically and an electric terminal 33 is provided for this purpose. Also secured to the under surface 27 of the wing 28 at a point spaced rearward from the flange 26 is a further flange or bracket 31 formed with a stop member 36 adapted to cooperate with a spherical head 37 forming the end of a rod 38 secured by means of a nut 39 to the terminal part 40 of a rib element 41 secured to the rocket support. The operative face of the stop element 36 comprises a spheroidal bearing surface 42 cooperating with the spherical head 37. The part-spherical bearing surface 42 extends into or merges with a conical surface 43 having a relatively small cone angle shown between the generatrix $a$ and the axis $z$ of this conical surface, this latter extending through the centre of the spherical surface and being parallel to Y—Y.

The system operates as follows. After all the rockets 16 have been fired, it being noted that the firing of the first rocket caused both fairings or cowls 17 and 18 to break up into small fragments, and the firing being effected, for example, by means of a rotary distributor switch, the explosive charge 32 is then fired, for example by the use of an additional contact provided on the rotary switch. The explosion of charge 32 shears the pin 29 and expels the arm 20 attached to the rocket support; the expelling force is obviously directed along the common axis Y—Y of the tubular appendage 25 and arm 20. Since the direction of the propelling force is substantially parallel to the resultant of the weight of the support with the aerodynamical forces exerted thereon, the tubular part 22 will readily slide out of the appendage 23 without opposition. The ball element 37 which cooperated with bearing surface 42 to retain the support by opposing the various forces which were exerted on said support, disengages the bearing surface 42. At this time the slight angular divergence between conical surface 42 and the axis $z$ ensures that the ball element will not encounter any opposition in its movement.

What we claim is:

Apparatus for suspending and releasing a rocket support from a portion of an aircraft comprising a tubular guide extending downwardly at a predetermined angle from said portion, said angle depending at least in part on the location of the center of gravity of said support to facilitate thereby a jettisoning of said support, a tubular member accommodated within said guide and connected to the support, said guide and member defining corresponding apertures, a shear pin accommodated in the apertures to lock the member to the guide, said guide and member further cooperatively defining a chamber adapted for housing an explosive charge, a bracket on said portion, said bracket defining a spherical surface directed away from the tubular guide, the spherical surface merging into a conical surface having an axis substantially parallel to the tubular guide, a spherical member abutting said spherical surface, and means connecting the spherical member to the support to prevent the latter from pivoting with respect to said tubular guide.

References Cited in the file of this patent

UNITED STATES PATENTS

| | | |
|---|---|---|
| 2,398,871 | Turnbull et al. | Apr. 23, 1946 |
| 2,400,248 | Morgan | May 14, 1946 |
| 2,489,984 | Shoemaker | Nov. 29, 1949 |
| 2,777,655 | Graham | Jan. 15, 1957 |
| 2,792,784 | Corrick et al. | May 21, 1957 |